Sheet 1, 2 Sheets.
F. A. Calvert.
Wool & Cotton Picker.
N° 3,120.   Patented Jun. 3, 1843.
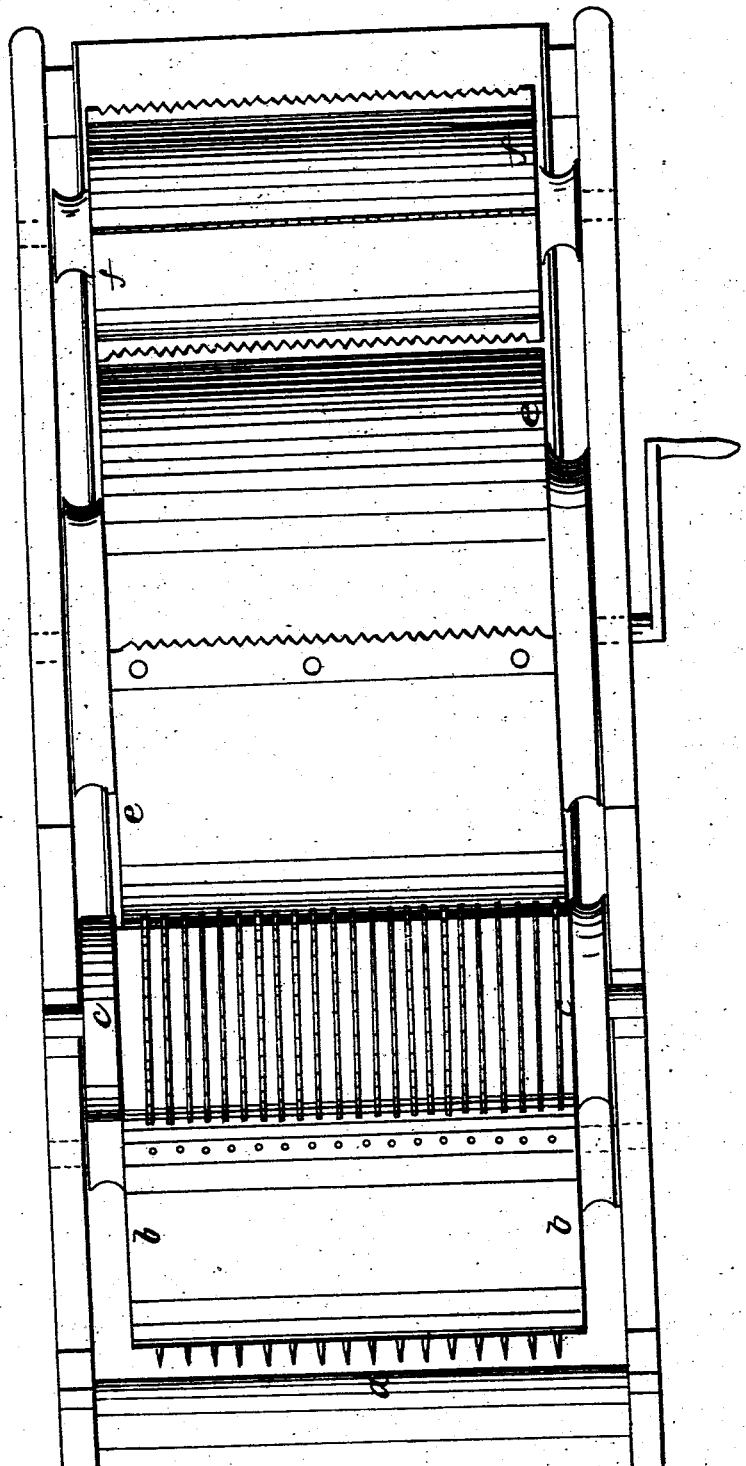

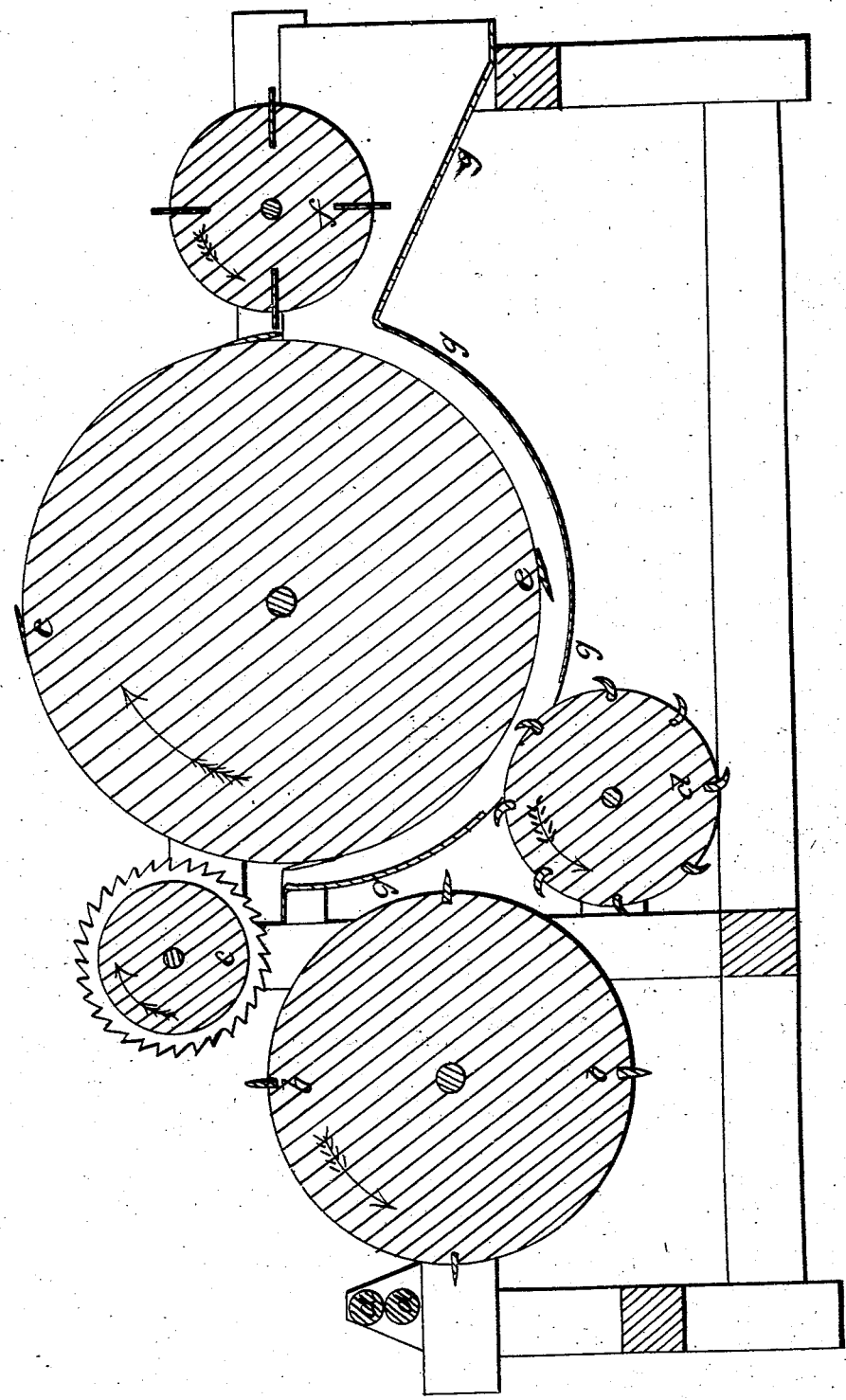

UNITED STATES PATENT OFFICE.

F. A. CALVERT, OF NEW YORK, N. Y.

MACHINE FOR PICKING WOOL AND SEPARATING BURS AND OTHER FOREIGN MATTER THEREFROM, ALSO APPLICABLE TO GINNING COTTON.

Specification forming part of Letters Patent No. 3,120, dated June 3, 1843; Reissued December 27, 1843, No. 59.

*To all whom it may concern:*

Be it known that I, FRANCIS A. CALVERT, of the city of New York, in the State of New York, have invented a new and useful machine for picking wool and for separating the burs and other foreign matter therefrom, and which may be applied also to the ginning of or separating the seeds from cotton; and I do hereby declare that the following is a full and exact description of my machine.

In the accompanying drawing, Figure 1, is a top view of my burring and cleaning machine, and Fig. 2, a vertical section thereof, from front to back, through the middle.

a, a, are the ordinary feed rollers, around one of which an endless apron, not represented in the drawing, is to pass, in the usual manner; b, b, is the picker cylinder which takes the wool, &c., from the feed apron, as in other machines for a like purpose; c, is a toothed, or saw, cylinder that takes the burs, &c., from the material as it is carried around on the fine-comb cylinder; d, is a cylinder which I denominate the receiver; which receiver, and the toothed or saw cylinder, constitute in their manner of combination with the other parts, the most important features of my new machine. e, e, is the fine-comb cylinder; f, is the fan, or cleaning, cylinder; these two last, and the first, or picker, cylinder, not differing from those before in use.

In using this machine, the cylinders are to move in the direction indicated by the arrows. For a machine of ordinary size, the picker cylinder may be about eighteen inches in diameter; the receiver about twelve inches; the fine-comb cylinder about two feet; the toothed or saw cylinder about six inches; the fan about twelve inches. The cylinders may be driven by bands and whirls, in the ordinary way, and their relative velocities should be nearly as follows: The fine-comb cylinder may have about three hundred, or three hundred and twenty five revolutions in a minute; the picker cylinder may perform two revolutions on its axis to one of the fine-comb cylinder; the receiver may make one revolution to two of the fine-comb cylinder; the same may be the case with the toothed, or saw, cylinder; the fan may revolve four times to each revolution of the fine-comb cylinder. Should the relative diameters of any of the cylinders be changed, their angular velocities are to be varied in a corresponding degree; for although it is not necessary that their peripheries should revolve with velocities precisely the same with those above indicated, the proper action of the machine will depend, in a considerable degree, upon the relative speed of the respective operating surfaces.

The wool, or cotton, placed upon the feeding apron, is taken therefrom by the picker cylinder, as heretofore, and from this it is taken by the teeth on the cylinder that I have denominated the receiver, which cylinder, as above remarked, constitutes a new feature in its combination with the burring and cleaning machine. The teeth upon the receiver are hooked, and may consist of strong card teeth; these teeth carry the wool, or cotton, to the fine comb cylinder; and by the employment of said cylinder the fiber is spread with much more evenness upon the fine-comb cylinder than has been attained under any arrangement heretofore adopted. There may be two, or more, such receivers, if preferred, placed one above the other, each of them running the same way, and performing a like office. The wool, or cotton, may in this case be spread thinner upon each of them, and the work be still performed with equal rapidity; an increase in the number of receivers will be found particularly advantageous with some kinds of wool and cotton.

The toothed cylinder c, I make in the following manner: I take the required number of circular saws of the proper diameter, and these I place upon a shaft, interposing disks of wood, or other substance, of about an eighth of an inch in thickness, between them; thus forming a cylinder of saws similar to that used in the saw gin for cotton, only with the saw plates nearer to each other. The teeth of this cylinder take the burs, seeds, or other foreign matter, from the wool, or cotton, on the fine-comb cylinder, and throw them toward the picker; and by the rapid motion of said cylinder they are beaten down, and fall under the machine; this beating down of the burs, &c., is not sensibly interfered with by the small quantity of wool on the teeth of the picker cylinder. In all the machines heretofore employed for the burring and cleaning of wool, much of the fiber has been broken by the instruments employed for the separation; this inconvenience and loss are completely obviated by the combining of the toothed, or saw, cylinder, constructed as above described, with the fine-comb cylinder. A casing of sheet metal, or other material, *g*, *g*, extends under the fine-comb cylinder, but has an opening which admits the action of the receiver upon said fine-comb cylinder; this casing prevents any portion of the burs from being carried back to the point of action between these two cylinders. The construction and action of the fan, or cleaning cylinder, are the same as in some other machines for a like purpose.

Having thus fully described the manner in which I construct my improved burring and cleaning machine, and shown the manner in which the same operates, what I claim therein as new, and desire to secure by Letters Patent, is—

1. The combining if a cylinder such as I have denominated the toothed, or saw, cylinder, with the fine comb cylinder of a burring, cleaning, or ginning, machine, in the manner and for the purpose set forth; I do not claim the constructing of such a cylinder as new in itself, but only as constituting, in its combination, a new and important feature in my machine.

2. I claim the combining of one, or more, of such cylinders as that herein described under the name of a receiver, with the picker and fine-comb cylinder, so as to operate between them, in the manner, and for the purpose, herein made known.

FRANCIS A. CALVERT.

Witnesses:
FREDK. W. COGGILL,
A. KIRTLAND.

[FIRST PRINTED 1913.]